Jan. 2, 1968   H. J. MESSER   3,361,410

LEVELLING DEVICES

Filed March 7, 1966

United States Patent Office 3,361,410
Patented Jan. 2, 1968

3,361,410
LEVELLING DEVICES
Hans J. Messer, 391 Queens St. S.,
Hamilton, Ontario, Canada
Filed Mar. 7, 1966, Ser. No. 532,372
15 Claims. (Cl. 254—101)

ABSTRACT OF THE DISCLOSURE

A levelling jack for very highly accurate levelling has spherical mating surfaces to accommodate misalignment. The surface finish of the flat faces that engage the floor or the device to be levelled is between 100 and 200 microinches, while the spherical surfaces are less than 32 microinches, to ensure that the spherical surfaces do not separate during leveling. The minimum radius of curvature of the surfaces is greater than the maximum distance of the spherical surfaces from the point of engagement of the jack device with the floor or the levelled device, and is determined by a mathematical relation between predetermined load, friction coefficient, spherical surface diameter and effective wedge angle thereof.

---

Figure 1:
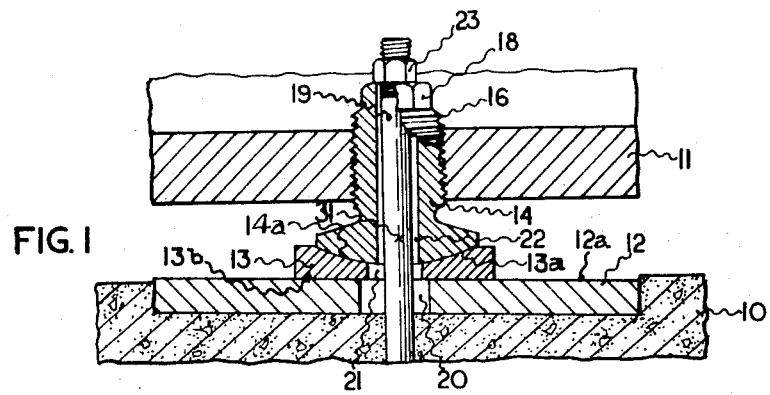

The present application is a continuation in part of my application Ser. No. 389,994, filed Aug. 17, 1964, for Levelling Jacks, now abandoned.

The present invention is concerned with improvements in or relating to levelling supporting devices and especially, but not exclusively, to levelling supporting jacks for use with apparatus that is to be fastened securely to the floor on which the jack stands.

It is almost invariably found in a commercial establishment that the floor on which apparatus is to be mounted is not sufficiently level and uniform, and levelling supporting devices must be provided between the apparatus and the floor to compensate for this. Each piece of apparatus will usually require the use of one such device that is also adjustable in length, such a device being commonly known as a "levelling jack." A number of problems are encountered in the application of such levelling supporting devices, these problems being especially difficult if the devices are to be adapted for use in supporting high precision apparatus, such as machine tools, or a floor that is itself to be used in the accurate assembly of other apparatus.

For example, with a jack device that has a part thereof rotatable to change its length, often it is not possible for the axis of rotation of that part to be disposed truly vertical, and transverse forces are then applied to the jack which may be sufficient to prevent it from being operated, and which may even be such as to damage or destroy it. It has been proposed hitherto, for example in an automobile or tree jack, to accommodate such vertical misalignment by forming two parts of the jack as a cooperating ball and socket connection so that the parts can tilt relative to one another.

It is an object of the present invention to provide a new levelling supporting device, and especially but not exclusively, a new levelling supporting jack device.

It is a particular object of the invention to provide a new levelling supporting device, and especially but not exclusively, a new levelling supporting jack device that is adapted for use in the supportive levelling of high precision apparatus.

In accordance with the present invention there is provided a levelling supporting device comprising a base member and a cooperating body member, the base member having a surface adapted to engage the floor on which apparatus is to be levelled and supported by the device, and the body member being adapted to engage the apparatus to be levelled and supported by the device, the base and body members engaging one another for relative transverse arcuate sliding movement by means of respective mating spherical surfaces of the same radius of curvature, through which surfaces the load of the supported apparatus is transmitted between the members, the said base member surface having an area at least equal to the respective areas of the said mating spherical surfaces, the said base member surface having a surface finish of between 100 and 200 microinches, and the said mating spherical surfaces having a surface finish of less than 32 microinches.

Also in accordance with the present invention there is provided a levelling supporting device comprising a base member and a cooperating body member, the base member being adapted to engage the floor on which apparatus is to be levelled and supported by the device, and the body member being adapted to engage the apparatus to be levelled and supported by the device, the base and body members engaging each other for relative transverse arcuate sliding movement by means of respective mating spherical surfaces of the same radius of curvature through which surfaces the load of the supported apparatus is transmitted between the members, the radius of curvature being greater than the maximum distance between the said spherical surface of the body member and the effective centre of engagement of either one of the base and body members respectively with the floor and the apparatus, and the minimum radius of curvature being derived from $$R^2 = \frac{P_H{}^2 + \tan \alpha^2 \left(\frac{c}{2}\right)^2}{\tan \alpha^2}$$

wherein $P_H$ and $c$ are as defined herein.

Figure 2:
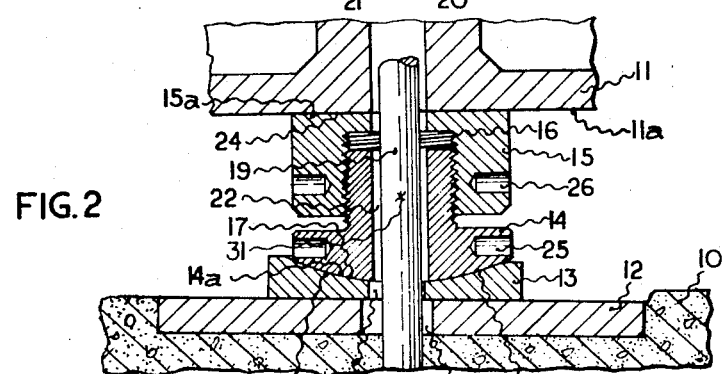
Figure 3:
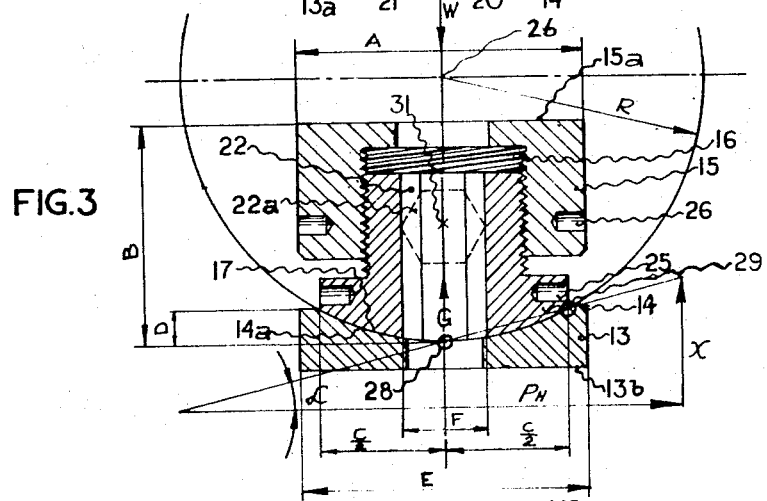
Figure 4:
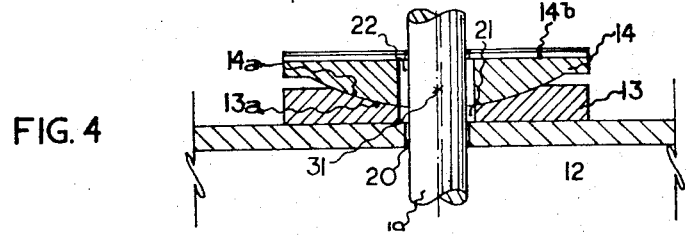

Particular preferred embodiments of the invention will now be described, by way of example, with reference to the accompanying diagrammatic drawing wherein:

FIGURES 1 and 2 are similar longitudinal cross-sections through two different forms of levelling jack device, FIGURE 3 is another similar view of the embodiment of FIGURE 2, constituting an explanatory diagram, and FIGURE 4 is a view similar to FIGURES 1 and 2 through a levelling support washer.

Similar parts are given the same reference in all the figures of the drawing.

Referring now to FIGURE 1, the floor 10 on which apparatus 11 is to be mounted is shown herein as being a cement floor. A floor plate 12, on the upper surface 12a of which the jack device is disposed, is itself disposed in a corresponding prepared recess in the floor, and, for purposes of illustration, is shown in the drawing as being inclined at a small angle to the floor, which may itself not be truly horizontal and level at this location. The jack proper comprises a base member 13, which is of generally circular shape as seen in plan, and which has the major central portion of its upper surface 13a thereof concave, the base member being simply laid on the floor plate 12 with its flat lower surface 13b in contact with the said upper face 12a. The jack also comprises a body member 14, which in this embodiment is adapted to engage the apparatus 11 by having the upper part 16 thereof screw-threaded for engagement in a corresponding screw-threaded bore in the said apparatus. The body member has a convex surface 14a which mates with the corresponding concave surface 13a, both of the surfaces 13a and 14a being segments of spherical surfaces of the same radius of curvature. The body and base members may be rotated relative to one another by the use of a wrench of conventional type applied to a part 18 of the body member, which part has the form of a hexagon nut. An anchor bolt 19 cemented into the floor 10 passes with ample clearance through registering bores 20, 21 and 22 in the floor plate 12, the base member 13 and the body member 14 respectively, and is provided at its upper end with a nut 23 by which the jack members are clamped rigidly together when the apparatus supported thereby has been accurately levelled.

In operation, the floor plate 12 and the base member 13 are placed over the anchoring bolt 19, while the body member 14 is screw-threaded into the apparatus to be supported. The apparatus is then placed in position so that the two jack parts are together, with the anchoring bolt 19 extending through the bore 22 in the body member. The height of the apparatus is then adjusted, and/or the apparatus is levelled, by rotating the body member with a wrench applied to the head 18. It will be apparent that before the nut 23 is tightened the surfaces 13a and 14a are held together by the weight of the supported apparatus, which is transmitted between the parts through these surfaces. Because of their convex-concave relationship it is possible to rotate the two parts 13 and 14 relative to one another and they will remain in load-transmitting engagement, even when the longitudinal axis of the part 14 is inclined at a relatively large angle to the corresponding axis of the part 13. Moreover, with the parts so inclined it is possible to rotate them relative to one another without applying substantial transverse forces to either part, since any such forces of appreciable magnitude will simply cause the two parts to slide relative to one another by transverse arcuate relative sliding movement of the surfaces 13a and 14a. Finally the nut 23 is tightened to clamp and retain the jack parts together.

An embodiment such as is illustrated by FIGURE 1 requires that the apparatus to be supported by the jack is provided with a screw-threaded bore that will accept the part 14, or alternatively that the part 14 is externally threaded to mate with the thread of the bore in the apparatus 11. Such a requirement is avoided by use of the embodiment of FIGURE 2, in which the body member comprises two parts 14 and 15 which are screw-threaded together, the lower part 14 having the convex surface 14a, while the upper part is provided with a flat horizontal face 15a for engagement with a corresponding flat surface 11a at the underside of the apparatus 11. Moreover, in this embodiment it is the two parts 14 and 15 which are rotated relative to one another to change the length of the jack, the cooperation between the members 13 and 14 being only to accommodate any angular misalignment between the members. Means for rotating the two parts 14 and 15 relative to one another comprise two sets of apertures 25 and 26 that are adapted to receive the ends of respective tommy bars. Alternatively, or in addition, the central aperture of the part 14 may be made non-circular, e.g., to have the hexagonal cross-section 22a illustrated in broken lines in FIGURE 3, for reception of a tool of corresponding cross-section by which it can be rotated. As with the previously-described embodiment, such relative rotation of the two parts 14 and 15 may be affected readily, since the convex and concave surfaces are able to slide relative to one another in a corresponding arcuate plane to accommodate such angular misalignment. The upper part of the anchoring bolt is not shown in FIGURE 2, but it will have substantially the same form as the bolt of FIGURE 1.

The embodiment of FIGURE 4 is a levelling supporting device comprising the parts 13 and 14 only, the latter having a flat upper surface 14b; the device is able to accommodate misalignment between the surfaces 18 and 27 but is unable to provide any adjustment in vertical spacing. A through-bolt 19 is provided, as with the two previously described embodiments.

Special problems are encountered in supporting levelling devices intended for use with high accuracy apparatus, such as lathes, boring mills, assembly floors, etc., and are met in a simple and effective manner by devices in accordance with this invention. In general, it will be appreciated that such apparatus must be levelled to a degree of accuracy comparable to that of its own operation, and the levelling must remain at this degree of accuracy for a suitable period of time under the strains, etc., applied thereto by the apparatus in operation.

A first consideration is that the devices are of relatively massive construction for the loads that they are intended to carry, so that their vertical compression under such loads (and under the substantial overloads to which they are always subjected in practice) is negligible. For the same reasons a high load-bearing-capacity screw-thread is employed in the jacks, and it is arranged that at all times a minimum amount of the screw-thread is engaged and operative.

To ensure the desired stability the height of the jack devices is comparatively low relative to their diameter, and their centres of gravity are arranged to be as low as possible. With a jack device that is too high and/or has too high a centre of gravity there is a tendency for the jack to tip, not only as the result of side loads, but also under the action of the vertical load. Referring to FIGURE 3, the construction of the embodiment of FIGURES 2 and 3 must be such that the maximum distance B (FIGURE 3) between surfaces 14a and 15a is less than the radius R of the surfaces 13a and 14a from the centre 26. In the case of the embodiment of FIGURE 1, as will be apparent to those skilled in the art, it is the effective centre of any rotational moment exerted by the apparatus 11 on the jack device that must be spaced less than the radius R from the surface 14a. The same condition will also apply if the devices are inverted, in which case the distance B would be measured from the spherical surface to the floor. The same condition applies also to the levelling devices of FIGURE 4 and is more readily achieved therewith than with the other embodiments. The centres of gravity of the three devices are indicated in the respective figures by the referenc 31.

For reasons of stability also the general minimum width of the jack (as indicated by dimension A in FIGURE 3) should at least be equal to the maximum distance between the surfaces 14a and 15a (dimension B), such a relation ensuring that the body member will tip and slide relative to the base member from the weight of the supported apparatus above, allowing the load to seat squarely on the surface 15a of the body member.

It is also important for successful operation that there be a predetermined ratio between the area of the surfaces 13a and 14a, the load which those surfaces must transmit, and the radius of curvature thereof. Generally the surfaces 14a and 13a will be circular as seen in plan, so that it is possible to refer to their area radius in explaining this relationship, and it will be apparent to those skilled in the art that in the case of non-circular surfaces an equivalent area radius can readily be determined. The size of the said area radius is determined principally by the weight that the jack is intended to support, and in practical embodiments the weight per unit area for the surfaces 13a and 14a is kept in the neighbourhood of 1,000 pounds per square inch. With the area radius known the curvature radius can be determined and for proper practice of the invention the area radius to curvature radius should not be less than 1:1.5, preferably is not less than 1:1.75 and more preferably is not less than 1:2. Moreover, the minimum preferred ratios preferably are only employed for jacks of the smaller sizes (i.e. for loads in the neighbourhood of 1–2,000 pounds) and the said ratio is increased substantially progressively as the designed load increases to a value of at least 1:3, preferably 1:3.2 even 1:3.6 for jacks in the larger sizes (i.e. for loads in the neighbourhood of 12–20,000 pounds). It may be noted however, that the ratio will in general reach a peak in the neighbourhood of loads of 8–12,000 pounds, and thereafter may increase again, since the area radius will increase to accommodate the heavier loads, but the curvature radius is already sufficiently large for further increase not to be completely necessary.

An important consideration is that, as the load is applied to the device, initially any misalignment must first be accommodated by arcuate transverse sliding between the two surfaces 13a and 14a to the maximum possible extent, but if the misalignment is such that it cannot be so accommodated, then transverse sliding of the part 13 (and/or of the part 14 in the case of embodiments of FIGURES 2 to 4) will take place without the vertical separation of the surfaces 13a and 14a. In the case of the jack devices, as the part 14 is rotated to adjust the height of the device, the misalignment must initially be accommodated by the arcuate sliding; if the misalignment is too great then transverse sliding of the whole jack must be possible without vertical separation of the surfaces 13a and 14a, since if they separate accuracy is immediately lost and it is usually impossible to achieve satisfactory levelling. Another disadvantage of such separation is that the parts of the surfaces 13a and 14a remaining in contact are subjected to extremely severe local overloads that may be sufficient to distort them permanently, rendering the jack inaccurate, and useless for accurate levelling. When transverse sliding of the whole jack has taken place to the required extent, then the condition must again exist that misalignment will be accommodated by transverse arcuate relative sliding between the surfaces 13a and 14a without the possibility of separation thereof.

Accordingly, I have found that the desired characteristics of such devices can be achieved by providing that the area of surface 13b is equal to or greater than the area of each of the surfaces 13a and 14a, and also by forming the surface 13b with a finish within predetermined limits and in a predetermined relation to the finish of the surface 13a and 14a. In the case of the embodiments of FIGURE 2 the considerations applied to the surface 15a are equivalent to those applied to the surface 13b, while in the case of the embodiment of FIGURE 4 the equivalent considerations apply to the surface 14b. In particular, the finish of the surfaces 13b and 15a should be between 100 and 200 microinches, and preferably within the neighbourhood of 125 microinches, while the finish of the surfaces 13a and 14a should not be greater than 32 microinches and preferably within the neighbourhood of 16 microinches. It is also important that the surfaces 13a and 14a mate together as closely as possible, and to this end they are often lapped together by rotating the two parts 13 and 14 relative to one another, while under axial pressure, and with a suitable lapping compound between the surfaces. At other times a suitable lubricant such as a high pressure grease may be provided between the surfaces.

The minimum radius R for a device intended for a predetermined load will be determined by the considerations described in detail above, but there is also a maximum value that should not be exceeded if the said vertical separation is to be completely avoided. The determination of this maximum value is illustrated by FIGURE 3, wherein A and E are respectively the diameters of the surfaces 15a and 13b, C is the horizontal diameter of the faces 13a and 14b projected to a corresponding flat plane, F is the diameter of the bore 22, D is the vertical extension of the surfaces 13a and 14a (measured from their lowest common point 28 to their highest point of engagement 29 as seen in the figure), $P_H$ is the horizontal component of any sideways thrust that is applied to the part 13 or the part 14 of the device, while G is the upward force resulting from $P_H$ and the wedge action between the faces 13a and 14a at the effective angle $\alpha$. If G is greater than W then vertical separation of the faces 13a and 14a will take place. The angle $\alpha$ is measured between any chord line which extends through the said two points 28 and 29 and a corresponding intersecting horizontal line. The relation between $P_H$ and G may be expressed as:

$$P_H = \mu G \cos \alpha + G \sin \alpha$$

where $\mu$ is the coefficient of friction between the two surfaces 13a and 14a, so that $$G = \frac{P_H}{\mu \cos \alpha + \sin \alpha} \leq W$$

$$\tan \alpha = \frac{x}{P_H}, \text{ where } x = \sqrt{R^2 - \left(\frac{c}{2}\right)^2}$$

from which can be obtained the relation $$R^2 = \frac{P_H{}^2 + \tan \alpha^2 \left(\frac{c}{2}\right)^2}{\tan \alpha^2}$$

from which relation the minimum value of R can be derived.

It will be appreciated by those skilled in the art that although the factors of height, width, radius of spherical surfaces and load capacity have been considered separately above they are interdependent one with another, and a change in one factor must also be considered in connection with its effect on the other factors.

It will be noted that in each embodiment a single through bolt preferably is employed, and when employed is arranged to clamp together the supported apparatus, the device, and the floor on which the apparatus is supported by the device. Such an arrangement may be contrasted with prior art arrangement in which a through bolt only clamps together parts of the device, and separate fastening means are employed if the device is to be fastened to the floor and/or the supported apparatus. Because of this positive connection the mass of the supporting floor becomes effectively added to that of the supported apparatus, with a consequent general reduction of vibration of the apparatus. Of greater practical importance, however, is the fact that the positive connection between the floor and the apparatus includes the closely mated spherical surfaces 13a and 14a, with the result that vibrations having a horizontal component have that component particularly suppressed, even with the moderate clamping forces employed with the devices of this invention. Such suppression is not obtained, for example, when levelling has been effected by means of replaceable flat shims, even when such shims are clamped with the highest possible clamping forces.

In addition to its function as an anchoring member the bolt 19 also cooperates with the bores 20, 21 and 22 to ensure that any angular misalignment between the parts of the device is kept below preferred limits. Thus, in the embodiments shown the diameter of the bolt 19 is so related to that of the bore 22 that any angular misalignment between the pack parts cannot be greater than about 3½ degrees in any direction. It is contemplated that in other embodiments a misalignment of up to 5 degrees may be permitted, but a figure of 3–3½ degrees in preferred.

Although in the three embodiments illustrated the base member 13 has a concave surface 13a and the body member 14 a convex 14a it will be appreciated that in other embodiments the reverse may be the case.

It will be apparent that by this invention there is provided a new form of levelling supporting device that is of inexpensive construction, is simpler to operate than such devices known hitherto, is inherently free from the possibility of fracture or distortion, and is particularly adapted for high accuracy applications.

What I claim is:

1. A levelling supporting device comprising a base member and a cooperating body member, the base member having a surface adapted to engage the floor on which apparatus is to be levelled and supported by the device, and the body member being adapted to engage the apparatus to be levelled and supported by the device, the base and body members engaging one another for relative transverse arcuate sliding movement by means of respective mating spherical surfaces of the same radius of curvature, through which surfaces the load of the supported apparatus is transmitted between the members, the said base member surface having an area at least equal to the respective areas of the said mating spherical surfaces, the said base member surface having a surface finish of between 100 and 200 microinches, and the said mating spherical surfaces having a surface finish of less than 32 microinches.

2. A levelling supporting device comprising a base member and a cooperating body member, the base member being adapted to engage the floor on which apparatus to be levelled and supported by the device, and the body member being adapted to engage the apparatus to be levelled and supported by the device, the base and body members engaging each other for relative transverse arcuate sliding movement by means of respective mating spherical surfaces of the same radius of curvature through which surfaces the load of the supported apparatus is transmitted between the members, the radius of curvature being greater than the maximum distance between the said spherical surface of the body member and the effective center of engagement of either one of the base and body members respectively with the floor and the apparatus, and the minimum radius of curvature being derived from $$R^2 = \frac{P_H^2 + \tan \alpha^2 \left(\frac{c}{2}\right)^2}{\tan \alpha^2}$$

$\alpha$ is the effective wedge action angle between the mating spherical surfaces;

C is the horizontal diameter of the mating spherical surfaces projected to a corresponding flat plane;

$P_H$ is defined by the relation $P_H = \mu G \cos \alpha + G \sin \alpha$;

$\mu$ is the coefficient of friction between the mating spherical surfaces; and

G is the upwardly acting force resulting from sideways thrusts upon the device and must be less than the predetermined load to be carried by the device.

3. A device as claimed in claim 2, wherein the said base member has a surface adapted to engage the said floor, the said base member surface has a surface finish of between 100 and 200 microinches, and the said mating sperical surfaces have a surface finish of less than 32 microinches.

4. A device as claimed in claim 1, wherein the said body member has a surface which engages the apparatus to be levelled and supported by the device, and the said body member surface has a surface finish of between 100 and 200 microinches.

5. A device as claimed in claim 1, wherein the height of the said device is such that the maximum distance between a surface of the body member that engages the apparatus and the spherical surface of the body member is less than the radius of curvature of the said spherical surface.

6. A device as claimed in claim 5, wherein the height of the said device is such that the maximum distance between a surface of the base member that engages the floor and the spherical surface of the base member is less than the radius of curvature of the said spherical surface.

7. A device as claimed in claim 1, wherein both the base and the body members are provided with registering longitudinal bores for the reception of an anchoring bolt, and the diameter of the said anchoring bolt is so related to the diameter of the bores through which it passes that axial misalignment between the said base and body members cannot be more than 3½ degrees in any direction to avoid self-tilting.

8. A device as claimed in claim 1, and comprising a levelling jack, wherein the said body member is adapted to engage the apparatus to be supported by having a portion thereof screw-threaded to engage in a corresponding screw-threaded bore in the apparatus.

9. A device as claimed in claim 1, and comprising a levelling jack, wherein the said body member consists of two parts screw-threaded together and rotatable relative to one another to change the height of the jack, one part providing the respective spherical surface and the other part being adapted to engage the apparatus to be supported.

10. A device as claimed in claim 9, wherein the diameter of the body member is at least equal to the maximum distance between the surface thereof that engages the apparatus and the spherical surface thereof.

11. A device as claim in claim 8, wherein the diameter of the base member is at least equal to the maximum distance between the surface thereof that engages the floor and the spherical surface thereof.

12. A device as claimed in claim 1, wherein the ratio of the area radius to curvature of radius for the said spherical surfaces is greater than 1:1.75, and increases progressively from the neighbourhood of 1:2 for a device intended for a load in the neighbourhood of 1–2,000 pounds to the neighbourhood of 1:3 for a device intended for a load in the neighbourhood of 8–12,000 pounds.

13. A device as claimed in claim 3, wherein the said body member has a surface which engages the apparatus to be levelled and supported by the device, and the said body member surface has a surface finish of between 100 and 200 microinches.

14. A device as claimed in claim 3, wherein the ratio of the area radius to curvature radius for the said circle surfaces is greater than 1:1.75, and the said radius increases progressively from the neighbourhood of 1:2 for a device intended for a load in the neighbourhood of 1–2,000 pounds to the neighbourhood of 1:3 for a device intended for a load in the neighbourhood of 8–12,000 pounds.

15. A device as claimed in claim 3, wherein both the base and the body members are provided with registering longitudinal bores for the reception of an anchoring bolt, and the diameter of the said anchoring bolt is so related to the diameter of the bores through which it passes that axial misalignment between the said base and body members cannot be more than 3½ degrees in any direction to avoid self-tilting.

References Cited

UNITED STATES PATENTS

| | | | |
|---|---|---|---|
| 1,572,856 | 2/1926 | Watson et al. | 254—101 |
| 1,810,657 | 6/1931 | Kohler | 254—101 |
| 1,810,667 | 6/1931 | Larson et al. | 254—101 |

OTHELL M. SIMPSON, *Primary Examiner.*